UNITED STATES PATENT OFFICE.

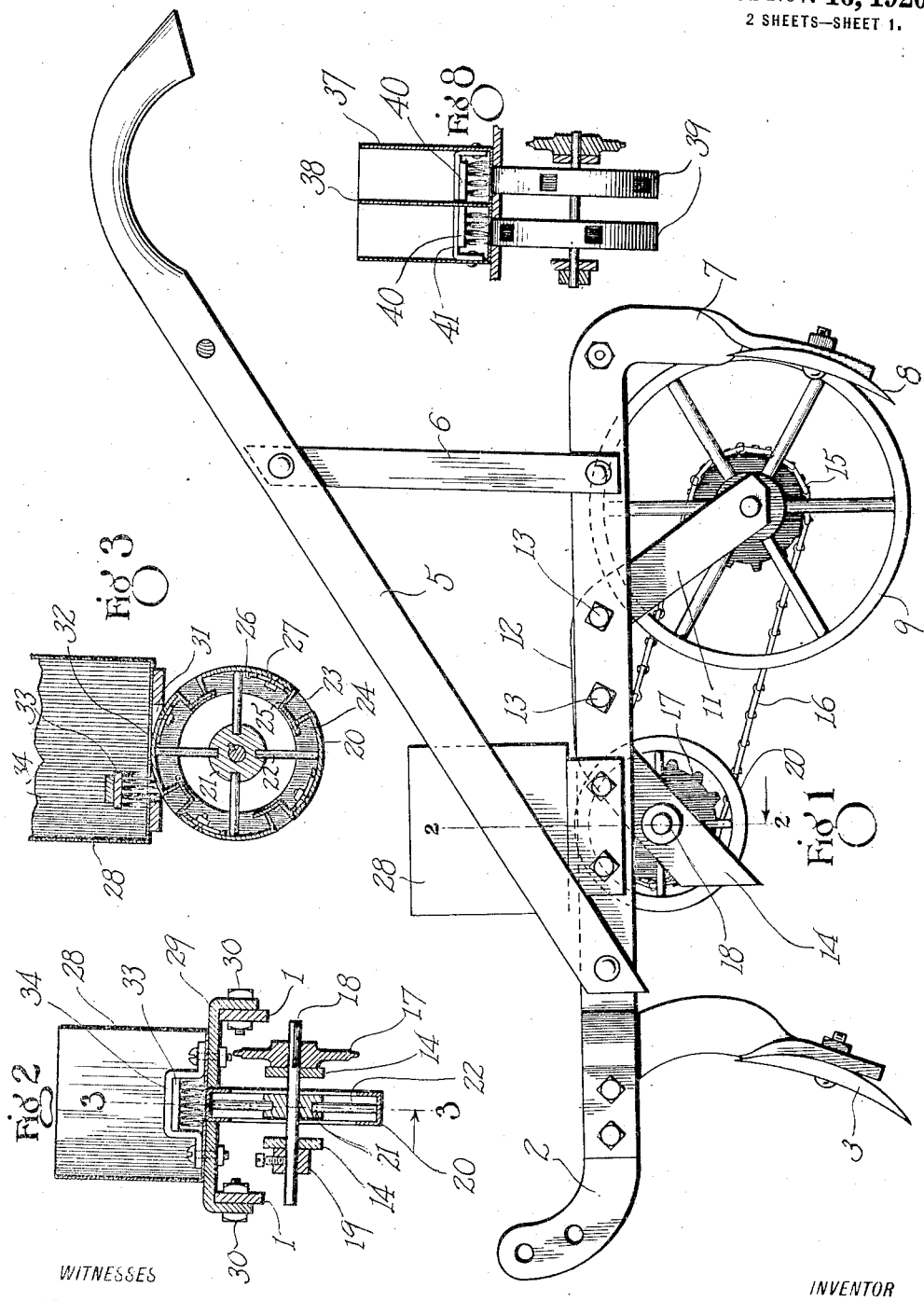

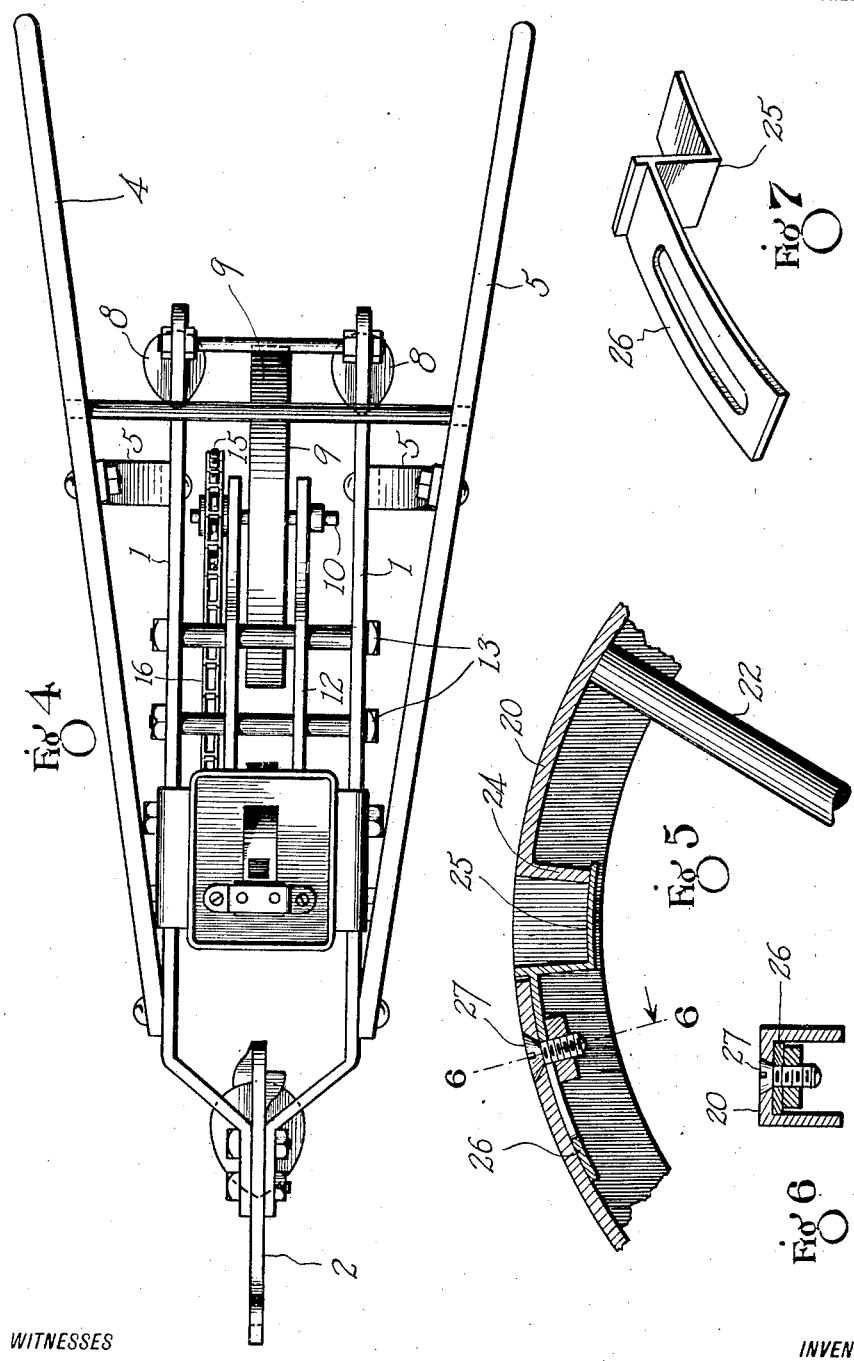

HARRY JONES, OF MANCHESTER, GEORGIA.

PLANTER.

1,358,747.　　　　Specification of Letters Patent.　　Patented Nov. 16, 1920.

Application filed February 21, 1920. Serial No. 360,346.

*To all whom it may concern:*

Be it known that I, HARRY JONES, a citizen of the United States, and a resident of Manchester, in the county of Meriwether and State of Georgia, have invented certain new and useful Improvements in Planters, of which the following is a specification.

My invention is an improvement in planters, and has for its object to provide an implement of the character specified, adapted for planting hard grain, whatever the size, and for planting grain of several different sizes, at the same time, wherein the construction is simple, devoid of intricate parts, and of easy adjustment.

In the drawings:—

Figure 1 is a side view of the improved planter;

Fig. 2 is a section on the line 2—2 of Fig. 1;

Fig. 3 is a section on the line 3—3 of Fig. 2,

Fig. 4 is a plan view of the machine shown in Fig. 1;

Fig. 5 is a partial section of the planting wheel in the plane thereof;

Fig. 6 is a section on the line 6—6 of Fig. 5,

Fig. 7 is a perspective view of the pocket forming angle plate;

Fig. 8 is a view similar to Fig. 2 showing a modified construction adapted for simultaneously planting two kinds of seed.

In the present embodiment of the invention, a suitable frame is provided, consisting of side members 1 arranged substantially parallel and offset inwardly at their forward ends and connected to the beam 2 of a furrowing plow 3. Handles 4 are connected with the side members at their forward ends, and these handles diverge slightly toward the rear of the frame and are braced against the side members 1 by braces 5.

Each side member of the frame has at its rear end a depending portion 7 which forms a plow standard, to which is connected a plow 8, and between these plows and in front of the same there is mounted a wheel 9. This wheel is secured to a shaft 10, which is journaled in the rear arms 11 of brackets, whose bodies 12 are connected to the side members of the frame, between the same and in spaced relation, by means of bolts 13, the said brackets having also forwardly depending arms 14.

The arms 11 and the arms 14 extend at an obtuse angle to the bodies of the bracket, the arms of each bracket diverge from each other, and a spring wheel 15 is secured to the shaft 10 between a side member 1 and a bracket 12. This sprocket wheel is connected by a chain 16 with a sprocket wheel 17 on a shaft 18, which is journaled between the forwardly depending arms 14 of the brackets 12.

The sprocket wheel 17, as will be seen by reference to Fig. 2, is connected to the shaft 18, and the said sprocket wheel is on the outer face of the adjacent plate 14. A stop collar 19 is adjustably held on the shaft outside the opposite bracket by means of set screws as shown in Fig. 2, and a wheel is secured to the shaft between the brackets 14. This wheel as shown more particularly in Figs. 2 and 3 consists of a channel shaped rim 20 and a hub 21 which is connected to the rim by spokes 22, and the hub is keyed to the wheel so that it must move therewith.

The channel of the rim is arranged inwardly, and the bottom of the channel, that is, the periphery of the wheel is cut away at intervals as shown at 23 in Fig. 3, one end of each cut-away portion or opening having an inwardly extending radial flange 24. This flange assists in forming a pocket with the side walls of the channel, and with an angle plate 25 which is adjustably connected with the bottom wall of the channel, or the periphery of the wheel.

Each angle plate has at one of its portions an arc shaped extension 26 which laps upon the inner face of the bottom of the channel, and each of these extensions has a longitudinally extending opening through which passes a bolt 27, the bolt engaging the opening in the periphery of the wheel, and being engaged by a nut on the inner face of the channel bottom.

A magazine or seed container 28 is connected with the frame just above the wheel, by means of a substantially U-shaped plate 29. The magazine 28 rests upon the body of the plate 29, and the arms thereof are secured to the side members 1 by bolts and nuts 30 as shown, in Fig. 2. This plate 29 has in the body thereof a transversely extending passage 31 through which the wheel 21—22 extends and the hopper has an opening 32 in its bottom with which the open mouths of the pocket are adapted to register to receive seed from the hopper.

A brush 33 is secured above the opening 32, the said brush being held by a U-shaped bracket 34 secured to the bottom of the magazine and to the plate 29. The bristles of this brush depend from the opening 32, and contact with the periphery of the wheel slightly in front of the highest portion thereof.

In operation, the seed to be planted is placed in the magazine, and with any suitable draft mechanism at the beam 2, the machine is drawn through the field. As the machine is drawn through the field, the plow 3 opens a furrow and the drawing of the machine causes the wheel 20—21—22 to be rotated, from the wheel 9.

As each of the pockets comes beneath the opening of the magazine, a charge of seed is dropped therein, and the excess seed is swept off by the brush. It will be evident that as many pockets may be provided in the wheel as may be found necessary, three being provided in the present instance, and any or all of these pockets may be varied in size or closed completely if desired. If for instance, it is desired to plant the seed near together all the pockets will be used, and they will be adjusted in size in accordance with the character of the seed being fed, the pockets being small for small grain and large for larger grain. If it is desired to drop the seed at intervals of twice the length, the intermediate pockets are closed, while if it is desired to drop the seed far apart all the pockets but one are closed. The pockets may be easily closed by loosening the set screw 27 and moving the angle plate toward the flange 24.

If desired two containers or magazines may be provided as shown in Fig. 8. In this construction, the magazine 37 is divided by a vertical partition 38 into two compartments, and a dropping wheel 39 is arranged below each compartment, each wheel corresponding to the wheel 20—21—22 and being similarly mounted and controlled.

A brush 40 is arranged in each compartment, the brushes being supported by the bracket 41. The pockets in the wheels may register, or they may alternate with each other, or any suitable arrangement may be provided.

I claim:—

1. A dropping wheel having in the periphery thereof a series of pockets, and means in connection with each pocket for varying the size thereof or for closing the pocket as may be desired, said means comprising an angle plate having a portion thereof extending into the pocket adjacent to one wall and a portion lying on the periphery of the wheel and adjustably connected therewith.

2. In a planter, a dropping wheel having a series of peripheral pockets, each pocket having a side wall movable toward and from the opposite side wall for varying the capacity of the pocket, and means for holding said wall in adjusted position.

3. In a planter, a magazine, having a plurality of compartments, a dropping wheel journaled below each compartment, said wheels being connected to rotate together, each wheel having peripheral pockets spaced apart from each other, the pockets of one wheel alternating with those of the other.

HARRY JONES.